United States Patent
van Rensburg (10) Patent No.: US 12,212,890 B2
(45) Date of Patent: Jan. 28, 2025

(54) METHODS AND SYSTEMS FOR PRE-RECORDED PARTICIPATION IN A CONFERENCE

(71) Applicant: RingCentral, Inc., Belmont, CA (US)

(72) Inventor: Christopher van Rensburg, Portland, OR (US)

(73) Assignee: RingCentral, Inc., Belmont, CA (US)

( * ) Notice: Subject to any disclaimer, the term of this patent is extended or adjusted under 35 U.S.C. 154(b) by 210 days.

(21) Appl. No.: 17/867,293

(22) Filed: Jul. 18, 2022

(65) Prior Publication Data

US 2024/0021217 A1    Jan. 18, 2024

(51) Int. Cl.
| | |
|---|---|
| *H04N 7/15* | (2006.01) |
| *H04L 65/403* | (2022.01) |
| *H04N 7/14* | (2006.01) |
| *G11B 27/00* | (2006.01) |

(52) U.S. Cl.
CPC ............ *H04N 7/15* (2013.01); *H04L 65/403* (2013.01); *H04N 7/147* (2013.01); *H04N 7/148* (2013.01); *H04N 7/157* (2013.01); *G11B 27/005* (2013.01)

(58) Field of Classification Search
None
See application file for complete search history.

(56) References Cited

U.S. PATENT DOCUMENTS

| | | | |
|---|---|---|---|
| 10,542,126 B2 * | 1/2020 | Nayak | H04L 12/1831 |
| 2016/0182580 A1 * | 6/2016 | Nayak | H04L 65/4038 709/204 |
| 2022/0070242 A1 * | 3/2022 | Bhatt | H04L 65/80 |
| 2022/0345780 A1 * | 10/2022 | Shem Tov | H04N 21/4662 |

* cited by examiner

*Primary Examiner* — Quoc D Tran (57) ABSTRACT

The present disclosure provides methods and systems for creating recordings for virtual conferences. According to one of the embodiments a computer-implemented method is provided. The method comprises: requesting that an invitee of a virtual conference, through a conferencing platform, create a pre-recording to be played during the virtual conference; receiving the pre-recording, through the conferencing platform, from the invitee prior to the conference; storing the pre-recording in a database associated with the conferencing platform; identifying, through the conferencing platform, a first request from a first participant to perform an action on the pre-recording during the conference; and in response to identifying the request from the participant, performing the action, through the conferencing platform, on the pre-recording during the conference.

19 Claims, 6 Drawing Sheets

METHODS AND SYSTEMS FOR PRE-RECORDED PARTICIPATION IN A CONFERENCE

TECHNICAL FIELD

The present disclosure relates generally to the field of computer-supported communications. Specifically, the present disclosure relates to systems and methods for facilitating a pre-recorded participation in a collaboration environment.

BACKGROUND

A couple of years of the Covid-19 pandemic left a huge mark on personal and work communications around the world. More and more real-life meetings and conferences are switching to online meetings or conferences even though the Covid-19 restrictions are getting less strict. Online conferencing is easier to schedule and requires only a phone or a laptop to participate from any part of the world. These aspects boost the popularity of conferencing platforms on the one hand, but, on the other hand, it tends to increase the number of conferences needed to be visited by one single person. This might not be a problem for a passive viewer of the conference, that is, for a passive attendee of a conference who is not actively participating during the conference, because they can always watch the conference recordings, read through a transcript of the conference, or watch a summary of the conference.

The increased number of conferences, however, may be a problem for active or key participants of a conference, like presenters, stakeholders, and panelists. Currently, there is no way for such participants to participate in multiple conferences that are scheduled for the same time. Alternatively, some unexpected circumstances might occur after the conference is scheduled, making it impossible for such participants to attend the conference. If a key participant lets an organizer know that they are not able to participate for any variety of reasons, the conference may be postponed or even canceled, because there is no point in meeting without the key participants. Furthermore, there is no solution in the art allowing the key participant to leave the conference without consequence for other participants.

Thus, there is an unsolved problem of how active or key participants can participate in multiple simultaneous conferences that are scheduled for the same time or would otherwise miss due to unexpected circumstances, without canceling or postponing the conference.

SUMMARY

The appended claims may serve as a summary of the invention.

BRIEF DESCRIPTION OF THE DRAWINGS

The accompanying drawings, which comprise a part of this specification, illustrate several embodiments and, together with the description, serve to explain the principles disclosed herein. In the drawings.

DETAILED DESCRIPTION

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying," "contacting", "gathering", "accessing", "utilizing", "resolving", "applying", "displaying", "requesting", "monitoring", "changing", "updating", "establishing", "initiating", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

A "computer" is one or more physical computers, virtual computers, and/or computing devices. As an example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, Internet of Things (IoT) devices such as home appliances, physical devices, vehicles, and industrial equipment, computer network devices such as gateways, modems, routers, access points, switches, hubs, firewalls, and/or any other special-purpose computing devices. Any reference to "a computer" herein means one or more computers, unless expressly stated otherwise.

The "instructions" are executable instructions and comprise one or more executable files or programs that have been compiled or otherwise built based upon source code prepared in JAVA, C++, OBJECTIVE-C or any other suitable programming environment.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Computer storage media can include volatile and non-volatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

It is appreciated that present systems and methods can be implemented in a variety of architectures and configurations. For example, present systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

It should be understood, that terms "user" and "participant" have equal meaning in the following description.

Embodiments are described in sections according to the following outline:
1.0 GENERAL OVERVIEW
2.0 STRUCTURAL OVERVIEW
3.0 FUNCTIONAL OVERVIEW
4.0 PROCEDURAL OVERVIEW 1.0 General Overview The current disclosure provides a technological solution to the technological problem of processing pre-recorded participation in online conferences.

Nowadays, many conferencing platforms such as Microsoft Teams, Zoom Meetings, Webex by Cisco, and others, provide a number of features to make participation in video or audio conferences more comfortable and productive. Those features help participants spend less time and get greater results from the conference. For example, some features may provide transcripts of conferences for invitees who did not attend the conference. Some features provide video or audio recordings for such invitees. Other features generate summaries of conferences, which helps non-attending invitees catch up even faster. However, while these features are helpful for invitees who would be passive participants in a conference but are not able to attend, such features do not solve the problem for key invitees who are required to attend a conference, such as a presenter, stakeholder, or panelist, but who are not able to attend, such as if they need to also participate in another conference, or if they unexpectedly need to deal with a family or medical emergency. These active participants are commonly known as key participants because their participation is required for a meeting or conference.

A webinar is a solution for online or semi-online presentations where a recording of a presentation could be presented to participants, while the actual presenter may not even be a participant in the particular event. Webinars provide a broadcasting type of presentation where many participants can connect to watch the presentation. These participants are not able to interact with the presentation due to the fundamental architectural difference between webinars and conferences. Only the host of the webinar can control the playback, etc. of the presentation. Therefore, there is a need for a collaboration system that provides a pre-recorded participation functionality as well as in-conference interaction with the pre-recording.

The current disclosure provides a technological solution to the identified problem by providing methods and systems for handling pre-recorded participation in conferences. In one aspect of the present disclosure, a computer-implemented method for creating recordings for virtual conferences is provided. The method comprises the steps of: requesting that an invitee of a virtual conference, through a conferencing platform, create a pre-recording to be played during the virtual conference; receiving the pre-recording, through the conferencing platform, from the invitee prior to the conference; storing the pre-recording in a database associated with the conferencing platform; identifying, through the conferencing platform, a first request from a first participant to perform an action on the pre-recording during the conference; and in response to identifying the request from the participant, performing the action, through the conferencing platform, on the pre-recording during the conference.

Therefore, the current solution provides the technological benefit of conformance for the recording and conferencing platform. Because the key participants create a pre-recording for the conference before the conference on the same conferencing platform on which the conference will take place, they can be sure that the pre-recording will be compliant with the technological requirements of the conferencing platform, with enhanced effectiveness of the conferencing platform itself.

As an additional technological benefit, integrating these pre-recordings within the conferencing platform provides enhanced technical functionalities for the conferencing platform. These enhanced technical functionalities provide options that otherwise would not have been available.

As a further achievement, the current solution provides the benefit of convenience for the invitee (key participant), because they can pre-record their participation on the conference platform itself, rather than pre-record their participation on a separate platform, then send the pre-recording to a conference participant to play during the conference.

As another achievement, all these aspects provide an increased time efficiency of conferences.

In one embodiment of the present disclosure, prior to identifying the first request, the first request is received from the first participant and a second request is received from a second participant to perform the first action on the pre-recording during the conference. Performing the action comprises performing the action in response to receiving the first request from the first participant and the second request from the second participant In another embodiment of the present disclosure, the request comprises one of a playback request, a pause request, or a resume request.

In another embodiment of the present disclosure, the request includes at least one of: a vocal utterance during the conference or a user interface interaction.

In another embodiment of the present disclosure, the pre-recording comprises one of video data, audio data, augmented reality (AR) data or virtual reality (VR) data.

In another embodiment of the present disclosure, prior to requesting that the invitee create the pre-recording, the system may identify that the invitee is not able to participate in conference.

In yet another embodiment of the present disclosure, the invitee comprises the participant.

According to a second aspect of the present disclosure, a non-transitory, computer-readable medium for creating recordings for virtual conferences is proposed. The medium stores a set of instructions that, when executed by a processor, cause the following: requesting that an invitee of a virtual conference, through a conferencing platform, create a pre-recording to be played during the virtual conference; receiving the pre-recording, through the conferencing platform, from the invitee prior to the conference; storing the pre-recording in a database associated with the conferencing platform; identifying, through the conferencing platform, a first request from a first participant to perform an action on the pre-recording during the conference; and in response to identifying the request from the participant, performing the action, through the conferencing platform, on the pre-recording during the conference.

According to a third aspect of the present disclosure, a system for creating recordings for virtual conferences is provided, the system comprises a processor; a memory operatively connected to the processor and storing instructions that, when executed by the processor, cause: requesting that an invitee of a virtual conference, through a conferencing platform, create a pre-recording to be played during the virtual conference; receiving the pre-recording, through the conferencing platform, from the invitee prior to the conference; storing the pre-recording in a database associated with the conferencing platform; identifying, through the conferencing platform, a first request from a first participant to perform an action on the pre-recording during the conference; and in response to identifying the request from the participant, performing the action, through the conferencing platform, on the pre-recording during the conference.

2.0 Structural Overview

Figure 1:
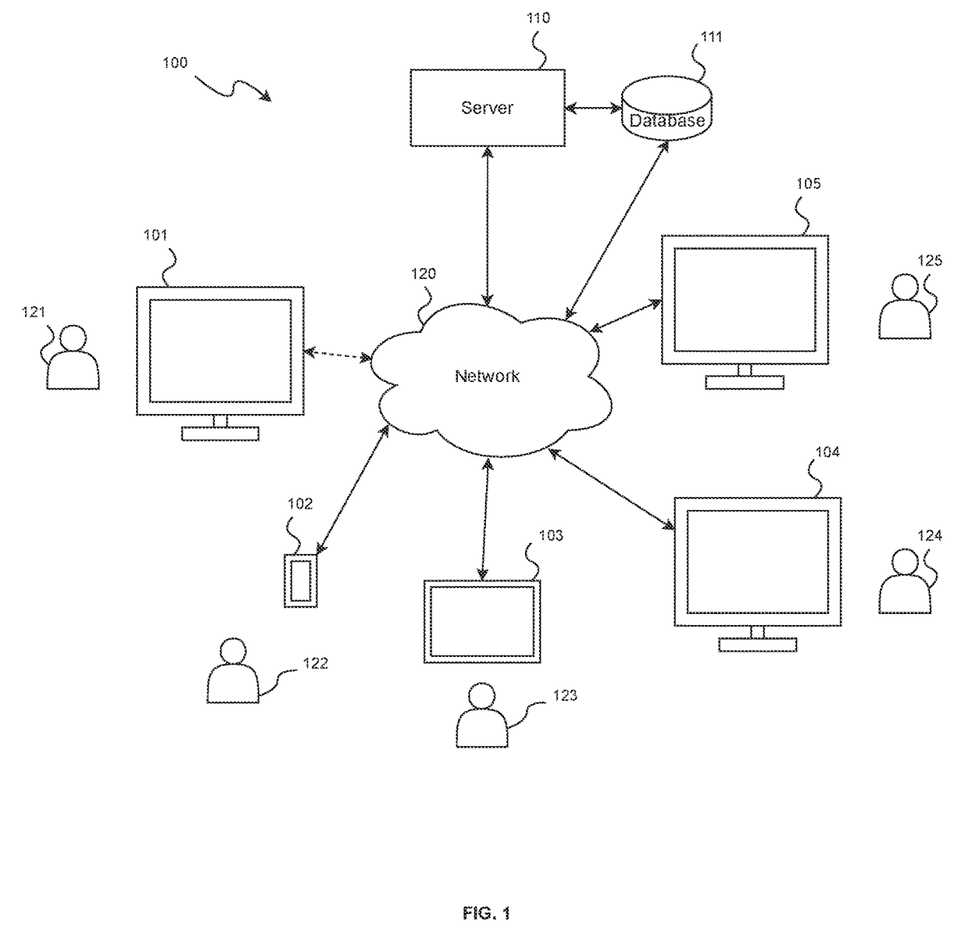
FIG. 1 is a diagram of a communication system, according to an example embodiment of the present disclosure

FIG. 1 shows a diagram of a communication system suitable for realization of one of the embodiments of a conferencing platform of the current disclosure.

The communication system 100 facilitates communications between user devices 101, 102, 103, 104, and 105 each associated with corresponding user 121, 122, 123, 124 and 125 and a server 110. Network 120 may be any type of network that provides communications or facilitates the exchange of information between the server 110 and user devices 101, 102, 103, 104, and 105. For example, network 120 broadly represents one or more local area networks (LANs), wide area networks (WANs), metropolitan area networks (MANs), global interconnected internetworks, such as the public internet, or other suitable connection(s) or combination thereof that enables communication system 100 to send and receive information between the user devices 101, 102, 103, 104, and 105 and the server 110. Each such network 120 uses or executes stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein are configured to connect to the network 120 and the disclosure presumes that all elements of FIG. 1 are communicatively coupled via network 120. A network may support a variety of electronic messaging formats, and may further support a variety of services and applications for user devices 101, 102, 103, 104, and 105.

In an embodiment, one or more of the user devices might not be connected to the server 110 during a conference, which is indicated by the dashed line between the user device 101 and the network 120.

In particular, user devices may be a desktop user device 101, 104 and 105 executing any known operational environment, e.g., MS Windows, MacOS, Linux or Unix. At the same time, other user devices may be mobile telephones, such as smartphone devices, e.g., user device 102, or tablets, e.g., user device 103, executing any of the known operational environments, e.g., Android OS or iOS.

Figure 2:
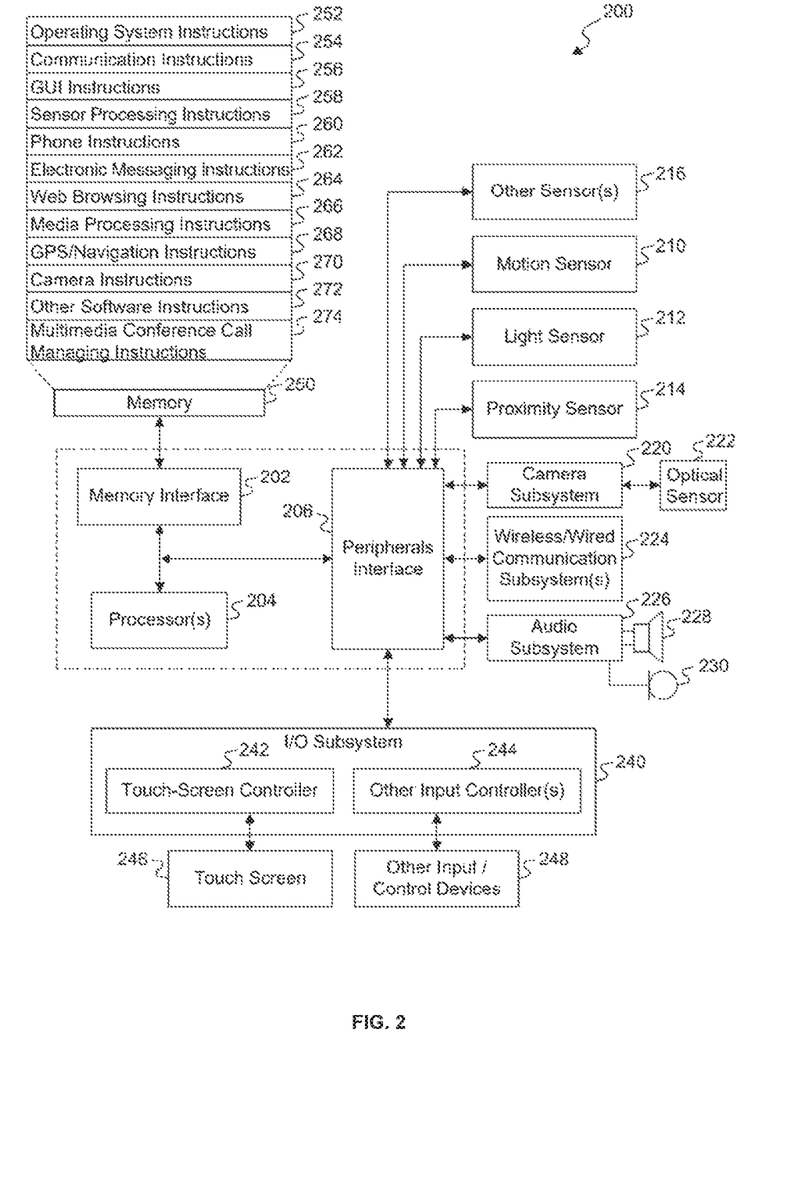
FIG. 2 is a diagram of a user device, according to an example embodiment of the present disclosure.

FIG. 2 is a diagram of an example of a user device 200 for use in a communication system, such as communication system 100. The user device 200 can be used to implement computer programs, applications, methods, processes, or other software to perform embodiments described in the present disclosure, such as the user devices 101, 102, 103, 104, and 105. The user device 200 includes a memory interface 202, one or more processors 204 such as data processors, image processors and/or central processing units, and a peripherals interface 206. The memory interface 202, the one or more processors 204, and/or the peripherals interface 206 can be separate components or can be integrated in one or more integrated circuits. The various components in the user device 200 can be coupled by one or more communication buses or signal lines.

Sensors, devices, and subsystems can be coupled to the peripherals interface 206 to facilitate multiple functionalities. For example, a motion sensor 210, a light sensor 212, and a proximity sensor 214 can be coupled to the peripherals interface 206 to facilitate orientation, lighting, and proximity functions. Other sensors 216 can also be connected to the peripherals interface 206, such as a positioning system (e.g., GPS receiver), a temperature sensor, a biometric sensor, or other sensing device, to facilitate related functionalities. A GPS receiver can be integrated with, or connected to, the user device 200. For example, a GPS receiver can be built into mobile telephones, such as smartphone devices, e.g., user device 102, or into tablets, e.g., user device 103. GPS software allows mobile telephones to use an internal or external GPS receiver (e.g., connecting via a serial port or Bluetooth). A camera subsystem 220 and an optical sensor 222, e.g., a charged coupled device ("CCD") or a complementary metal-oxide semiconductor ("CMOS") optical sensor, may be utilized to facilitate camera functions, such as recording photographs and video clips.

Communication functions may be facilitated through one or more wireless/wired communication subsystems 224, which includes an Ethernet port, radio frequency receivers and transmitters and/or optical (e.g., infrared) receivers and transmitters. The specific design and implementation of the wireless/wired communication subsystem 224 depends on the communication network(s) over which the user device 200 is intended to operate. For example, in some embodiments, the user device 200 includes wireless/wired communication subsystems 224 designed to operate over a GSM network, a GPRS network, an EDGE network, a Wi-Fi or WiMax network, and a Bluetooth® network.

An audio subsystem 226 may be coupled to a speaker 228 and a microphone 230 to facilitate voice-enabled functions, such as voice recognition, voice replication, digital recording, and telephony functions.

The I/O subsystem 240 includes a touch screen controller 242 and/or other input controller(s) 244. The touch screen controller 242 is coupled to a touch screen 246. The touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 246. While a touch screen 246 is shown in FIG. 2, the I/O subsystem 240 may include a display screen (e.g., CRT or LCD) in place of the touch screen 246.

The other input controller(s) 244 is coupled to other input/control devices 248, such as one or more buttons, rocker switches, thumb-wheel, infrared port, USB port, and/or a pointer device such as a stylus. The touch screen 246 can, for example, also be used to implement virtual or soft buttons and/or a keyboard.

The memory interface 202 is coupled to memory 250. The memory 250 includes high-speed random access memory and/or non-volatile memory, such as one or more magnetic disk storage devices, one or more optical storage devices, and/or flash memory (e.g., NAND, NOR). The memory 250 stores an operating system 252, such as DRAWIN, RTXC, LINUX, iOS, UNIX, OS X, WINDOWS, or an embedded operating system such as VXWorkS. The operating system 252 can include instructions for handling basic system services and for performing hardware dependent tasks. In some implementations, the operating system 252 can be a kernel (e.g., UNIX kernel).

The memory 250 may also store communication instructions 254 to facilitate communicating with one or more additional devices, one or more computers and/or one or more servers. The memory 250 can include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/navigation instructions 268 to facilitate GPS and navigation-related processes and instructions; camera instructions 270 to facilitate camera-related processes and functions; and/or other software instructions 272 to facilitate other processes and functions. The memory 250 may also include multimedia conference call managing instructions 274 to facilitate conference call related processes and instructions.

In some embodiments, the communication instructions 254 represent or include software applications to facilitate connection with the communication server 110 that connects a plurality of user devices with the purpose of realization of the conferencing platform. The conferencing platform may include any software application, including browsers or browser-like applications. The electronic messaging instructions 262 may include a software program to generate communication requests to the communication server 110 for carrying out communications. Further, the electronic messaging instructions 262 may include software applications to receive communication requests from the communication server 110. The graphical user interface instructions 256 may include a software program that facilitates display of the communication notifications to a user associated with the user device and facilitates the user to provide user input, and so on.

In the presently described embodiment, the instructions cause the processor 204 to perform one or more functions of the disclosed methods. For example, the instructions may cause the audio subsystem 226 to capture an audio and cause the wireless communication subsystem(s) 224 to transmit the audio to the communication server 150. In some embodiments, the instructions may cause the processors 204 to determine an importance of the communications based on received communication information.

Each of the above identified instructions and software applications may correspond to a set of instructions for performing one or more functions described above. These instructions may be implemented as separate software programs, procedures, or modules. The memory 250 may include additional instructions or fewer instructions. Furthermore, various functions of the user device 200 may be implemented in hardware and/or in software, including in one or more signal processing and/or application specific integrated circuits.

The user device 200 of FIG. 2 or the user devices 101, 102, 103, 104, and 105 of FIG. 1 may execute various applications stored in the memory 250. For the sake of the present disclosure, the memory 250 of the user device 200 may store a conferencing application of a conferencing platform which when executed by the processor(s) 204 instructs the user device to communicate with the server 110 or other user devices 101, 102, 103, 104, and 105 of via the network 120 of FIG. 1. In an embodiment, the conferencing application may be a browser-based application being part of the conferencing platform. In another embodiment, the conferencing application may be an application providing Web Real-Time Communication (WebRTC).

Figure 3:
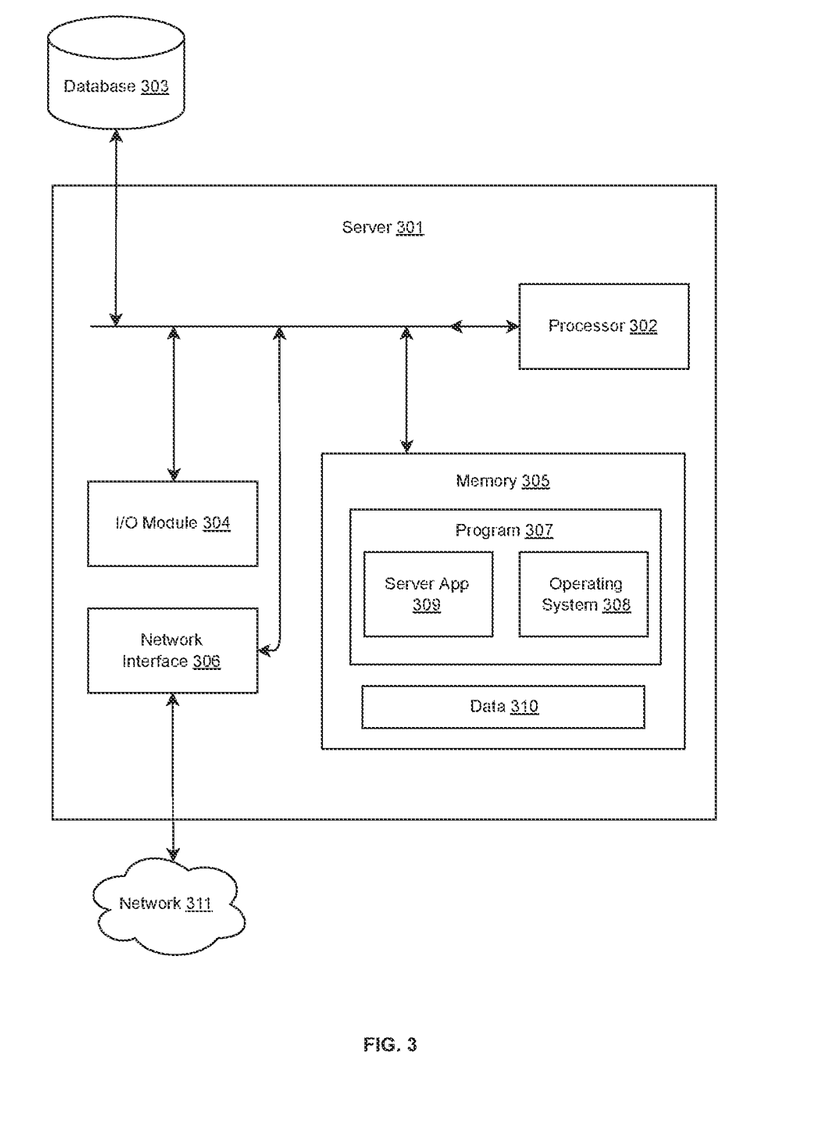
FIG. 3 is a diagram of a server, according to an example embodiment of the present disclosure.

FIG. 3 is a block diagram that illustrates an example of a collaboration server 301 suitable for implementing the disclosed systems and methods. The collaboration server 301 may include at least one processor, e.g., processor 302. The processor 302 may be operably connected to one or more databases (e.g., database 303), an input/output module 304, memory 305, and network interface device 306.

I/O module 304 may be operably connected to a keyboard, mouse, touch screen controller, and/or other input controller(s) (not shown). Other input/control devices connected to I/O module 304 may include one or more buttons, rocker switches, thumb-wheel, infrared port, USB port, and/or a pointer device such as a stylus.

Processor 302 may also be operably connected to memory 305. Memory 305 may include high-speed random access memory and/or non-volatile memory, such as one or more magnetic disk storage devices, one or more optical storage devices, and/or flash memory (e.g., NAND, NOR).

Memory 305 may include one or more programs 307. For example, memory 305 may store an operating system 308, such as DRAWIN, RTXC, LINUX, iOS, UNIX, OS X, WINDOWS, or an embedded operating system such as VXWorkS. Operating system 308 may include instructions for handling basic system services and for performing hardware dependent tasks. In some implementations, operating system 308 may comprise a kernel (e.g., UNIX kernel).

Memory 305 may also store one or more server applications 309 to facilitate communicating with one or more additional devices (e.g., the user devices 101, 102, 103, 104, and 105 of FIG. 1), one or more computers and/or one or more servers. Server applications 309 may also include instructions to execute one or more of the disclosed methods.

Memory 305 may also store data 310. Data 310 may include transitory data used during instruction execution. Data 310 may also include data recorded for long-term storage.

Each of the above identified instructions and applications may correspond to a set of instructions for performing one or more functions described above. These instructions need not be implemented as separate software programs, procedures, or modules. Memory 305 may include additional instructions or fewer instructions. Furthermore, various functions of server 301 may be implemented in hardware and/or in software, including in one or more signal processing and/or application specific integrated circuits.

Communication functions may be facilitated through one or more network interfaces (e.g., interface 306). Network interface 306 may be configured for communications over Ethernet, radio frequency, and/or optical (e.g., infrared) frequencies. The specific design and implementation of network interface 306 depends on the communication network(s) over which server 301 is intended to operate. For example, in some embodiments, server 301 includes wireless/wired network interface 306 designed to operate over a GSM network, a GPRS network, an EDGE network, a Wi-Fi or WiMax network, and a Bluetooth® network. In other embodiments, server 301 includes wireless/wired network interface 306 designed to operate over a TCP/IP network. Accordingly, network 311 may be any appropriate computer network compatible with network interface 306.

The various components in server 301 may be coupled by one or more communication buses or signal lines (not shown).

3.0 Functional Overview

Figure 4:
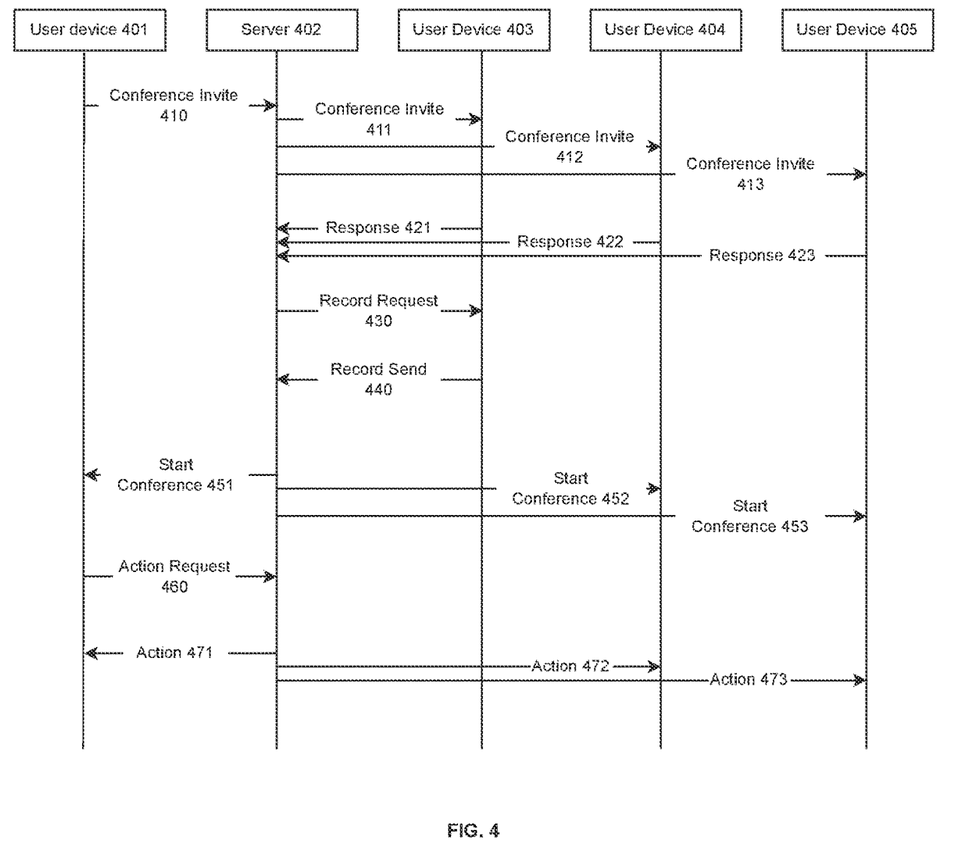
FIG. 4 is a diagram of communications between user devices and a server, according to an example embodiment of the present disclosure.

FIG. 4 shows a diagram of communications between user devices and a server according to one embodiment of the current disclosure. User device 401 (e.g., one of the above-mentioned user devices 101, 102, 103, 104, and 105 of FIG. 1 or the user device 200 of FIG. 2) stores a conferencing application in a memory (e.g., memory 250 of FIG. 2) and is executed by a processor (e.g., the processor 204 of FIG. 2). When executed, the conferencing application allows the user of the user device 401 to communicate with a server 402 (e.g., the server 110 of FIG. 1 or the server 301 of FIG. 3) of the conferencing platform.

The user of user device 401 may send a conference invitation 410 to a server 402 via the conferencing application. In an alternative embodiment, the user also may be able to send invitations via email, IM application, and so forth. In the example, the conference invitation 410 comprises an invitees list that identifies user devices 403, 404, and 405. Additionally, the conference invitation 410 may comprise an agenda indicating presenters, or other identification of the level of importance of users for the conference. As an example, the user of user device 403 is indicated as a presenter or important participant for the conference (so-called "key" participant). Usually, the conference invitation 410 may comprise time and day when the conference starts.

The server 402, in accordance with the invitees list, sends conference invitations 411, 412 and 413 to user devices 403, 404 and 405 correspondingly. The user devices 403, 404 and 405 may be the same type of device as user device 401 or any other type of device (the user devices 101, 102, 103, 104, and 105 of FIG. 1 or the user device 200 of FIG. 2).

Each of the user devices 403, 404 and 405 sends their responses 421, 422 and 423, correspondingly, in return. In this particular example, the user devices 404 and 405 respond positively, whereas the user device 403 responds negatively, which means for the server 402 that the user of the user device 403 will not be able to participate in the conference. In response to that, the server 402 may store instructions to analyze the agenda of the conference or the level of importance indicated in the conference invitation 410 to identify if the user of user device 403 is indicated as an important participant. As indicated above, the user of user device 403 is indicated as a key participant. Based on the analysis the server 402 may send a pre-recording request 430 to the user device 403. The pre-recording request 430 may instruct the user device 403 to render a graphical user interface (GUI) which helps the user of user device 403 create a pre-recording for the conference which will be stored on server 402. Said GUI may be a part of the conferencing application stored and executed on the user device 403, or part of a conferencing application executed on the server 402 and streamed to the user device 403 (e.g., as a remote desktop feature). This pre-recording could contain video data, audio data, augmented reality (AR) data, or virtual reality (VR) data that will be presented at the conference. For example, the user of the user device 403 may, using the microphone 230 of FIG. 2, create an audio pre-recording containing his opinion about a particular topic of the agenda. In another example, the user of the user device 403 may, using the camera subsystem 220 and the microphone 230 of FIG. 2, create a video pre-recording containing a presentation. In another example, the user of the user device 403 may, using the camera subsystem 220 of FIG. 2, create an augmented reality (AR) pre-recording containing an object (objects) for discussion covering a topic of the agenda. In yet another example, the user of the user device 403 may, using the camera subsystem 220 of FIG. 2, create a virtual reality (VR) pre-recording containing a virtual object (virtual objects) for discussion covering a topic of the agenda.

In another embodiment, a pre-recording may contain multiple media streams, such as video, audio, as well as a screen sharing stream in addition to the video stream of the presenter. Additionally, a pre-recording could contain a sequence of logical sections, each of which may be played back or requested individually. Said sections of a pre-recording may contain different types of data independently from each other. Furthermore, a pre-recording may also be accompanied by a script or transcription produced ahead of the conference, and any number of links or document attachments.

Upon creating the pre-recording, it may be sent (440) and stored on the server 402 (e.g., in the memory 305 of the server 301 of FIG. 3) or in an external database (e.g., the database 111 of FIG. 1 or the database 303 of FIG. 3) before the conference starts. The user of the user device 401 (the initiator or organizer of the conference) may be notified (not shown) that the user of the user device 403 will not attend the conference, however, the user of user device 403 may send the pre-recording of the presentation. At the same time, said information may be indicated to all participants of the conference before or during the conference via GUI.

As for an additional benefit of the proposed solution, since a pre-recording is stored in a server of a database for the period of time between the creation of the pre-recording and the start of the conference, additional processing could be applied to the pre-recording. In an embodiment, the server 301 may store instructions for properly transcribing the audio of the pre-recording in order to obtain a higher quality transcript than could be achieved in real-time (shorter latency) during the conference. In addition, the server 301 may store additional instructions for translating the transcript for a different language listener. In another embodiment, the server 301 may perform video post-processing to enhance the quality of the video, audio, or other media of the pre-recording. In yet another embodiment, the server 301 may store instructions to analyze the actual content of the pre-recording to update the agenda for the conference sent along with the invitation to the conference. For example, if the pre-recording was originally created to discuss "Budget for this quarter", but the actual content of the pre-recording covers both the "Budget for this quarter" and "Budget suggestions for the next quarter", then server 301 may send an updated agenda reflecting the adjusted item.

When the conference starts, in accordance with the time and date indicated in the conference invitation 410, the user devices 401, 404 and 405 may connect to the server 402 via a network (e.g., user devices 102, 103, 104 are connected to the server 110 via the network 120 of FIG. 1) for the conference and conversation starts. Server 402 may monitor all actions in the conference. At that time, the user device 403 may not be connected to the server 402 (e.g., the user device 101 of the FIG. 1). User device 401 may, using GUI, send to the server 402 an action request 460 indicating that a user wants to see the pre-recording stored on the server 402. In another example, the user of the user device 401 may say an utterance indicating that the pre-recording is requested to be shown now. In another example, the server 402 may track the course of the conference by timestamps of the topics of the agenda. In yet another example, the server 402 may track the course of the conference utilizing Natural Language Processing (NLP) algorithms on the content of the speech in the conference, identifying that the topic of the agenda associated with the pre-recording has started. If it is identified that the topic of the agenda associated with the pre-recording has started, the server 402 may perform the requested actions (471, 472 and 473) for all participants, i.e. it may start to play back the pre-recording for the participants.

In other embodiments, the action request 460 may contain a pause request, which may require the server 402 to pause playing back the pre-recording. In some embodiments, the action request 460 may contain a resume request, which may require the server 402 to resume playing back the pre-recording. In some embodiments, the action request 460 may contain a stop request, which may require the server 402 to stop playing back the pre-recording.

In an embodiment, the request may be identified by the server 402 from the video feed of the user devices 401, 404 and 405. For example, the request may be identified from the user's gesture. In a particular example, the user may raise a hand as the request to pause the pre-recording. In another example, requests may be identified from eye gestures (e.g., winking). In yet another embodiment, the server 402 may identify the user's facial reactions (e.g., confusion, questions, or distraction) which may indicate that the presentation should be paused for discussion or addressing the audience's questions.

Figure 5:
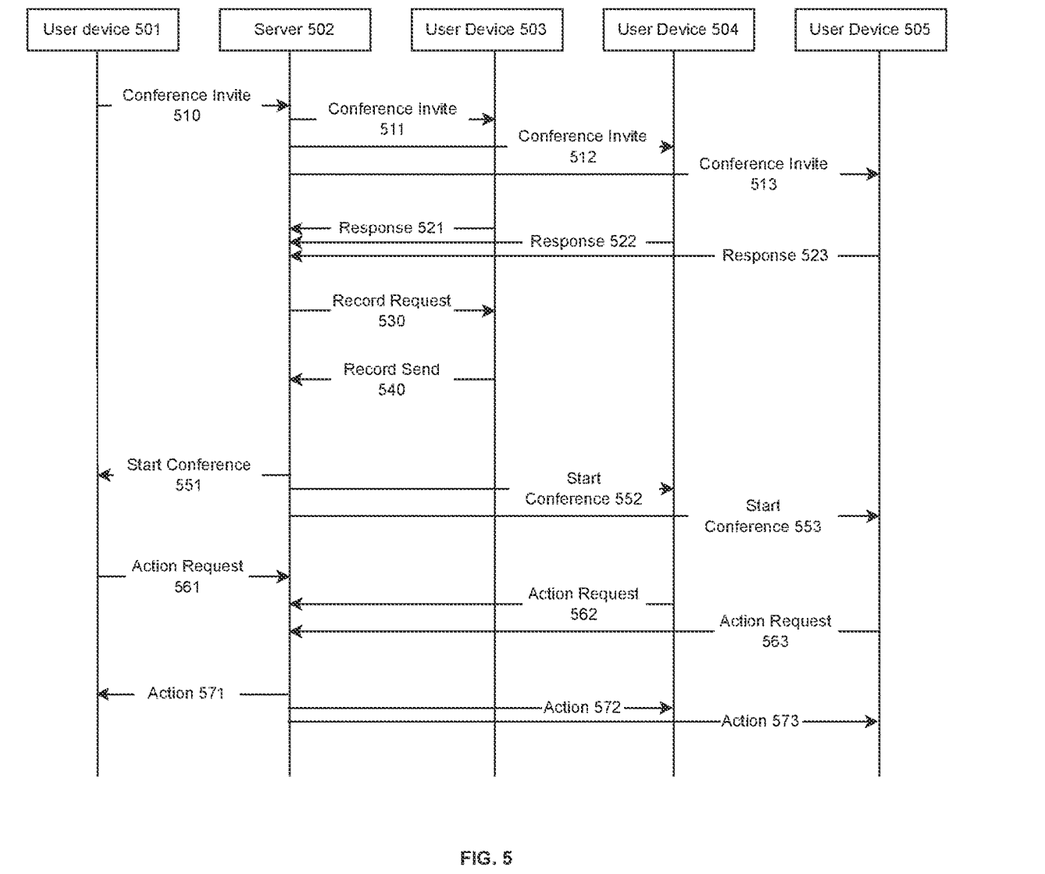
FIG. 5 is a diagram of communications between user devices and a server, according to another example embodiment of the present disclosure.

FIG. 5 shows a diagram of communications between user devices and a server according to one embodiment of the current disclosure. In this embodiment, a similar situation may take place as in the embodiment disclosed with reference to FIG. 4. The user of the user device 503 may send a negative response 521 to the conference invitation 511 and may send (540) the pre-recording to the server 502 using the same means as in the embodiment disclosed with reference to FIG. 4.

In this embodiment, it may be identified by the server 502 that all participants of the conference (the user devices 501, 504, and 505) are equal and there is no role such as a moderator of the conference, notwithstanding that the user of the user device 501 is an organizer of the conference. The indicated determination by the server 502 may be carried out by analyzing the conference invitations, user account databases, or enterprise email services, like Microsoft Exchange or Google Workspace. For example, the server 502 may look up the job titles of the participants or search through the organization chart. Alternatively, the user of the user device 501 may identify each participant's role in the conference invitation 510 using GUI.

Now, when the conference starts, each of the user devices 501, 504 and 505 participating in the conference may provide their action requests 561, 562 and 563 to the server 502, to make the server 502 perform the requested action. In this embodiment, the user device 501 may send the action request 561 to the server 502, the user device 504 may send the action request 562 to the server 502, and the user device 505 may send the action request 563 to the server 502. In some embodiments, server 502 may perform the requested action only upon receiving all action requests 561, 562 and 563. In an example, said action requests 561, 562 and 563 may comprise pause requests, which may require the server 502 to pause playing back the pre-recording. In some embodiments, the action requests 561, 562 and 563 may contain resume requests, which may require the server 520 to resume playing back the pre-recording. In some embodiments, the action requests 561, 562 and 563 may contain stop requests, which may require the server to stop playing back the pre-recording. It is to note that the server 502 may not perform an action with the pre-recording unless it receives the action requests 561, 562 and 563 of the same kind (e.g., all action requests 561, 562 and 563 are playback requests).

In an embodiment, the requests from each of the user devices 501, 504 and 505 may instigate actions that are device-specific and independent of any other device. In one embodiment, the organizer or moderator of the conference (e.g., use of the user device 501) may indicate via a GUI that the conference is a nonconcurrent conference where each of the participants is able to play back the pre-recording at any time and independently for their specific device. For example, the user device 501 may send the action request 561 at a first point in time to play back the pre-recording specifically for the user device 501 while the user device 504 may send the action request 562 at a second point in time to play back the pre-recording specifically for the user device 504.

In another embodiment, the user devices 501, 504 and 505 may request actions independently to perform actions for all devices in the conference. In this embodiment, the organizer or moderator of the conference (e.g., use of the user device 501) may indicate via a GUI that the conference is an equitable conference, where each of the participants is able to send requests at any time they want, and the actions will be performed for all devices in the conference. In a particular example, the user device 501 may send the action request 561 at a first point in time to play back the pre-recording for all the participants, the user device 504 may send the action request 562 at a second point in time to pause playing back the pre-recording for all the participants. Alternatively, the moderator of the conference can override another's requests and send a pause request so that playback on other devices is paused for a discussion or announcement.

In yet another embodiment, the server 502 may store, in the memory 305, an instruction to perform the requested action based on a majority of the participants or a predetermined number of participants who make the same request. For example, the user device 504 may send the action request 562 to pause playback of the pre-recording and the user device 505 may send the action request 563 to pause playing back the pre-recording. In response to receiving the action requests 562, 563, the server 502 may determine that two of the three user devices 501, 504, 505 that are currently engaged in a conference session responded with the same request to pause the pre-recording, resulting in a majority vote to pause the playback of the pre-recording. In another example, the server 502 may perform an action based on receiving at least two requests, at least three requests, or any other number of requests from any predetermined number of participants. For example, if the server 502 receives at least two requests, the server 502 may pause playing back the pre-recording, as in the previous example.

In some embodiments, user devices 501, 504 and 505 may send pause requests to the server 502 to pause playback of the pre-recording several times during the course of the presentation to discuss the presentation materials.

4.0 Procedural Overview

Figure 6:
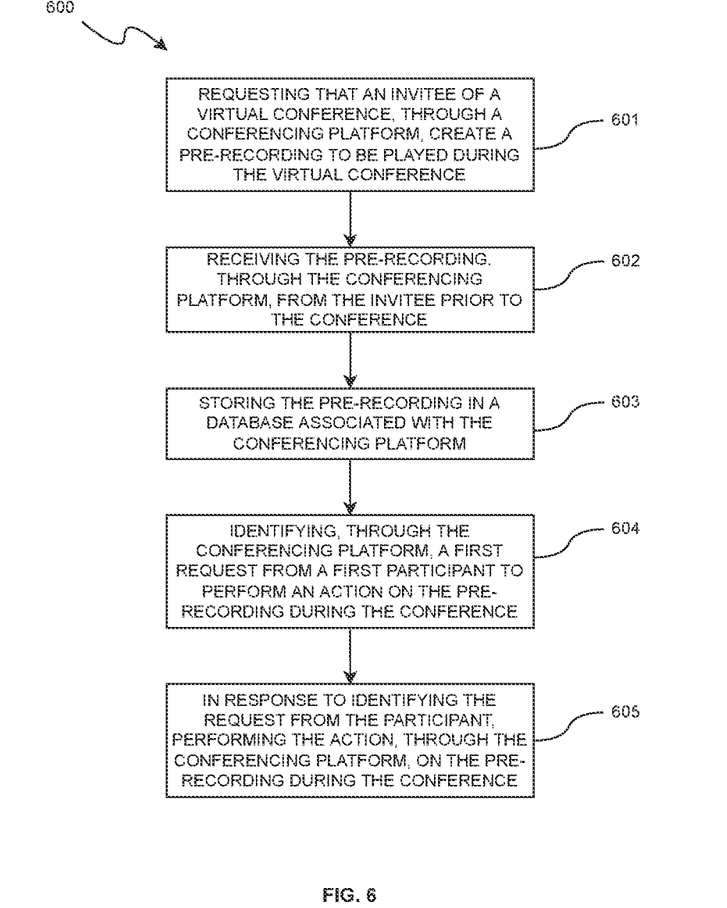
FIG. 6 is a flowchart of a method, according to an example embodiment of the present disclosure.

FIG. 6 shows a flowchart of an example method 600 for pre-recorded participation in a conference. Method 600 may be implemented using a general-purpose computer including a processor, e.g., collaboration server 301 of FIG. 3 or user device 200 of FIG. 2. Alternatively, a special-purpose computer may be built for implementing method 600 using suitable logic elements.

At step 601, the processor requests that an invitee of a virtual conference, through a conferencing platform, create a pre-recording to be played during the virtual conference. The processor may be one of the processor 204 of the user device 200 of FIG. 2 or the processor 302 of the server 301 of FIG. 3. Both the user device 200 and the server 301 may store in their memory a collaboration application supplied by the conferencing platform. In an embodiment, based on the instructions of the collaboration application stored in the memory 250 of the user device 200, the processor 204 of the user device 200 may render a GUI for the invitee to help to create the pre-recording for the conferencing platform. In another embodiment, based on the instructions of the collaboration application stored in the memory 305, the processor 302 of the user device 301 may render a GUI and stream the GUI to the user device 200 for the invitee to help to create the pre-recording for the conferencing platform. The GUI may be streamed from the server 301 to the user device 200 by the conferencing platform, or other external means, like the remote desktop feature of WebRTC.

The request itself may be transmitted as an electronic message from the server 301 to the user device 200 by the collaboration platform and rendered as a GUI by the processor 204 based on the instructions of the conferencing application stored in the memory 250 of the user device 200. The request may comprise a topic with which the user should create a pre-recording (e.g., "budget report for Q1 2020") and the time indicated for the topic in the agenda of the conference (e.g., "10 min.").

The GUI identified in this stream may be a common digital recording tool comprising a recording button, a pause button, a resume button, and a stop button. Further, the GUI may provide the user of the user device 200 with additional playback tools so that the user can play the pre-recording to check its quality/sufficiently.

At step 602, the processor receives the pre-recording, through the conferencing platform, from the invitee prior to the conference. The processor may be the processor 302 of the server 301 of FIG. 3. The user of the user device 200 may instruct the user device 200 to send the pre-recording via a network (e.g., the network 120 of FIG. 1) to the server. The user may utilize a GUI of the communication application stored in the memory 250 of the user device 200. In an example embodiment, user may create an audio/video/AR/VR pre-recording locally on the user device 200 and then send the pre-recording to the server 301. Alternatively, the user of the user device 200 may create an audio/video/AR/VR pre-recording on a server 301 using a WebRTC connection between user device 200 and a server 301 (e.g., connection of the user device 101 with the server 120 of FIG. 1). At the same time, the processor 302 of the server 301 according to the instructions stored in the memory 305 is instructed to receive the pre-recording for the user device 200.

At step 603, the processor stores the pre-recording in a database associated with the conferencing platform. The processor may be the processor 302 of the server 301 of FIG. 3. The server 301 may store in the memory 305 the instructions to store the received pre-recording. In this embodiment, the processor 302 may be instructed to store the pre-recording in the memory 305 of the server 301. In another embodiment, the processor 302 may be instructed to send the pre-recording to an external database (e.g., the database 303 of FIG. 3 or the database 111 of FIG. 1). In all cases, the pre-recording may be properly named and indexed so that the processor may get access to the pre-recording later when the conference starts.

At step 604, the processor identifies, through the conferencing platform, a first request from a first participant to perform an action on the pre-recording during the conference. The processor may be one of the processor 204 of the user device 200 of FIG. 2 or the processor 302 of the server 301 of FIG. 3. In one embodiment, the processor 204 of the user device 200 may identify, based on the instructions stored in the memory 250, that the content of the conference comprises a request. For example, the user may push a button of a GUI identifying that the pre-recording stored in the memory (e.g., the database 303 or in the memory 305 of the server 301) is needed to be played back. In another embodiment, the processor 204 may track the process of the conference using the agenda identifying the time frames for each topic. Alternatively, the processor 204 may analyze the speech of the user using NLP to identify the request from the speech of the user. For example, when the pre-recording has been prepared by Alex regarding the topic "Budget report", the user may say "let's see what Alex prepared for us" or "please play back the pre-recording from Alex" or "Let's check the budget report". After the processor 204 of the user device 200 identifies the request, the processor 204 may send the request to a server (e.g., server 110 of FIG. 1).

In yet another embodiment, the server 301 may receive all data streams of the conference from the user devices and a request is identified by the processor 302 of the server 301. The same algorithms and instructions may be used by the processor 302 of the server 301 as disclosed above with respect to the processor 204 of the user device 200.

It should be appreciated that the request may be sent to the server 301 prior to the start of the conference. In an embodiment, the moderator of the conference may send an action request to the server 301 while preparing for the conference in order to rearrange the items in the agenda. In an example, the user of the user device 200 may send to the server an action requests indicating the time when the pre-recording shall be played back. When the conference starts, the server 301 may identify the requests from the moderator and carry out the actions according to the requests.

It should be also appreciated that the invitee who created the pre-recording may send an action request to the server (e.g., server 301, 402, 502). In an embodiment, the user of the user device 200 while creating the pre-recording may indicate, via GUI, that the pre-recording shall be played back at the beginning of the conference. For example, processor 304 of the server 301 may be instructed to identify that request, when the conference starts, to play back an introduction and opening remarks recorded by one of the organizers of the conference. In another embodiment, the user of the user device 200 may indicate, via GUI, a time from the start of the conference when the pre-recording shall be played back. In yet another embodiment, the request sent to the server 301 prior to the start of the conference may contain a circumstance which, when detected by the server 301, the server 301 may start playing back the pre-recording. In a particular example, the user of the user device 200 while creating the pre-recording may indicate, via GUI, that the pre-recording shall be played back when at least 5 participants join the conference. In another example, the user may indicate that the pre-recording shall be played back when one of the participants raises a question about "budget for the next quarter".

At step 605, the processor in response to identifying the request from the participant, performs the action, through the conferencing platform, on the pre-recording during the conference. The processor may be the processor 302 of the server 301 of FIG. 3. The server 301 may store in its memory (e.g., the memory 305 of FIG. 1) instructions to perform an action regarding the identified request.

The request may contain a playback request, which may require the processor 302 to play back the pre-recording, a pause request, which may require the processor 302 to pause playing back the pre-recording, a resume request, which may require the processor 302 to resume playing back the pre-recording, and a stop request, which may require the processor 302 to stop playing back the pre-recording.

It should be appreciated that the playback request may contain additional details which may require a server (e.g., server 301, 402, 502) to start playing back the pre-recording from a specific point in time, from the beginning of a specific section, or at the start of discussion on a specific topic, and so on. In one example, the user may say "let's play back the last minute of the Budget report" to request the processor 302 to play back only the last minute of the pre-recording. In another example, the pre-recording may contain a first section which is video data and a second section which is audio data. In this example, the user may request the processor 302 to jump from the first section to the second section and vice versa.

For example, if it was identified by the processor 302 that the pre-recording should be played back, the processor 302 may start playing back the pre-recording to the participants. In a particular embodiment, the processor 302 may connect a virtual participant to the conference and play the video pre-recording within a tile of the virtual participant, as if the real participant who created the pre-recording has joined the conference. In another embodiment, the processor 302 may play an audio pre-recording as a background audio for every participant simultaneously. In yet another embodiment, the processor 302 may send a VR/AR data stream to all participants so that the whole display of each user devices is occupied with the VR/AR pre-recording.

In some embodiments, prior to performing an action, the processor 302 may be instructed to receive a number of requests. For example, the processor may receive a request of the same type from each of the user devices participating in the conference. In another embodiment, the processor may be instructed to receive a request from one particular user device (e.g., from the moderator).

Method 600 may include additional steps. For example, method 600 may further include, prior to requesting the invitee to create the pre-recording, a step of identifying that the invitee is not able to participate in the multi-party conference. In another embodiment, the processor 302 may be notified by a user device that the user will not be able to attend the conference (e.g., in response to a conference invitation via email); however, that same user, after creating a pre-recording for the conference, may be able to participate in the conference after all. In response to that, the processor 302 may notify the moderator of the conference (or all participants) that the absent key participant appeared and there may be no need to perform an action on the pre-recording.

What is claimed is:

1. A computer-implemented method for creating recordings for virtual conferences, the method comprising:

requesting that an invitee of a virtual conference, through a conferencing platform, create a pre-recording to be played during the virtual conference;

receiving the pre-recording, through the conferencing platform, from the invitee prior to the virtual conference;

storing the pre-recording in a database associated with the conferencing platform;

identifying, through the conferencing platform, from an audio feed or video feed of a first participant, a first request to perform a first action on the pre-recording during the conference; and in response to identifying the first request from the first participant, automatically performing the first action, through the conferencing platform, on the pre-recording during the conference.

2. The computer-implemented method of claim 1, further comprising:

prior to identifying the first request, receiving the first request from the first participant and a second request from a second participant to perform the first action on the pre-recording during the conference; and wherein performing the action comprises performing the first action in response to receiving the first request from the first participant and the second request from the second participant.

3. The computer-implemented method of claim 1, wherein the request comprises one of a playback request, a pause request, or a resume request.

4. The computer-implemented method of claim 1, wherein the request includes a vocal utterance or gesture during the conference.

5. The computer-implemented method of claim 1, wherein the pre-recording comprises one of video data, audio data, augmented reality (AR) data or virtual reality (VR) data.

6. The computer-implemented method of claim 1, further comprising:

prior to requesting that the invitee create the pre-recording, identifying that the invitee is not able to participate in the conference.

7. The computer-implemented method of claim 1, wherein the invitee comprises the participant.

8. A non-transitory, computer-readable medium storing a set of instructions that, when executed by a processor, cause:

requesting that an invitee of a virtual conference, through a conferencing platform, create a pre-recording to be played during the virtual conference;

receiving the pre-recording, through the conferencing platform, from the invitee prior to the conference;

storing the pre-recording in a database associated with the conferencing platform;

identifying, through the conferencing platform, from an audio feed or video feed of a first participant, a first request to perform a first action on the pre-recording during the conference; and in response to identifying the first request from the first participant, automatically performing the first action, through the conferencing platform, on the pre-recording during the conference.

9. The non-transitory, computer-readable medium of claim 8, wherein the instructions further comprise:

prior to identifying the first request, receiving the first request from the first participant and a second request from a second participant to perform the first action on the pre-recording during the conference;

and wherein performing the action comprises performing the first action in response to receiving the first request from the first participant and the second request from the second participant.

10. The non-transitory, computer-readable medium of claim 8, wherein the request comprises one of a playback request, a pause request, or a resume request.

11. The non-transitory, computer-readable medium of claim 8, wherein the request includes a vocal utterance or gesture during the conference.

12. The non-transitory, computer-readable medium of claim 8, wherein the pre-recording comprises one of video data, audio data, augmented reality (AR) data or virtual reality (VR) data.

13. The non-transitory, computer-readable medium of claim 1, wherein the instructions further comprise:

prior to requesting that the invitee create the pre-recording, identifying that the invitee is not able to participate in the conference.

14. A system for conferencing, the system comprising:

a processor;

a memory operatively connected to the processor and storing instructions that, when executed by the processor, cause:

requesting that an invitee of a virtual conference, through a conferencing platform, create a pre-recording to be played during the virtual conference;

receiving the pre-recording, through the conferencing platform, from the invitee prior to the conference;

storing the pre-recording in a database associated with the conferencing platform;

identifying, through the conferencing platform, from an audio feed or video feed of a first participant, a first request to perform first action on the pre-recording during the conference; and in response to identifying the first request from the first participant, automatically performing the first action, through the conferencing platform, on the pre-recording during the conference.

15. The system of claim 14, wherein the instructions further cause, prior to identifying the first request, receiving the first request from the first participant and a second request from a second participant to perform the first action on the pre-recording during the conference; and wherein performing the action comprises performing the first action in response to receiving the first request from the first participant and the second request from the second participant.

16. The system of claim 14, wherein the request comprises one of a playback request, a pause request, or a resume request.

17. The system of claim 14, wherein the request includes a vocal utterance or gesture during the conference.

18. The system of claim 14, wherein the pre-recording comprises one of video data, audio data, augmented reality (AR) data or virtual reality (VR) data.

19. The system of claim 14, wherein the instructions further comprise: prior to requesting that the invitee create the pre-recording, identifying that the invitee is not able to participate in the conference.

* * * * *